United States Patent [19]

Wyler

[11] 4,141,332
[45] Feb. 27, 1979

[54] ENCODED ELECTRICAL CONTROL SYSTEMS FOR VEHICLES

[75] Inventor: Leopold S. Wyler, Beverly Hills, Calif.

[73] Assignee: TRE Corporation, Beverly Hills, Calif.

[21] Appl. No.: 660,686

[22] Filed: Feb. 23, 1976

[51] Int. Cl.² .......................... F02P 9/00; F02P 11/00
[52] U.S. Cl. .............................. 123/148 R; 123/198 B
[58] Field of Search .......... 340/64; 123/148 R, 148 S, 123/146 B, 198 B; 325/64; 317/134; 290/DIG. 3

[56] References Cited

U.S. PATENT DOCUMENTS

| 3,339,141 | 8/1967 | Rothenbuhler et al. | 325/64 |
| 3,543,040 | 11/1970 | Nemeth | 340/64 |
| 3,587,950 | 6/1971 | Haigh | 340/64 |
| 3,596,243 | 7/1971 | Liebholz | 340/64 |
| 3,631,301 | 10/1969 | Goldman | 361/171 |
| 3,634,697 | 1/1972 | MacFarlane | 340/64 |
| 3,675,036 | 7/1972 | Davies | 123/148 S |
| 3,697,945 | 10/1972 | Comber | 340/64 |
| 3,851,227 | 11/1974 | Hedin | 361/170 |
| 3,941,955 | 3/1976 | Gerber | 361/171 |
| 3,987,408 | 10/1975 | Sassover et al. | 340/64 |

Primary Examiner—Samuel W. Engle
Assistant Examiner—Thomas H. Webb
Attorney, Agent, or Firm—Spensley, Horn, Jubas & Lubitz

[57] ABSTRACT

An encoded electrical control systems for motor vehicle employs an encoder/transmitter that provides an encoded signal and a receiver/decoder which effectuates control of an associated device only upon receipt of a signal containing the code unique to that specific receiver/decoder.

For motor vehicle applications, a secure ignition system is acheived by enclosing the encoder/transmitter in a tamperproof housing associated with the ignition switch assembly. The encoded signal is transmitted when the ignition switch is closed. The receiver/decoder is contained in another tamperproof housing adjacent an ignition system component essential to engine operation, and, only upon receipt of the unique, encoded signal from the transmitter, effectuates a necessary electrical connection to this ignition system component. Operation also may be initiated by an electronic lock in place of the conventional ignition switch.

10 Claims, 4 Drawing Figures

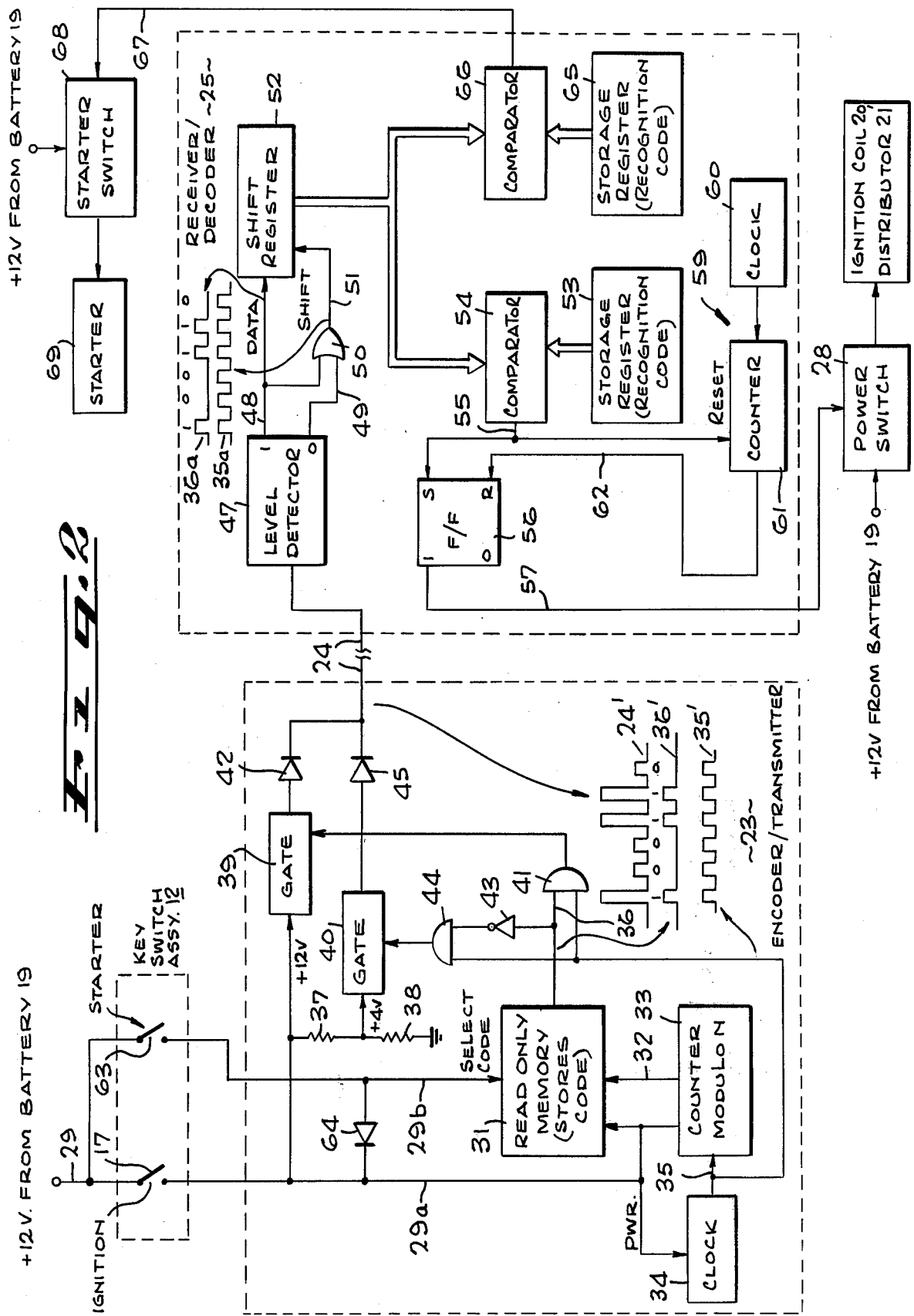

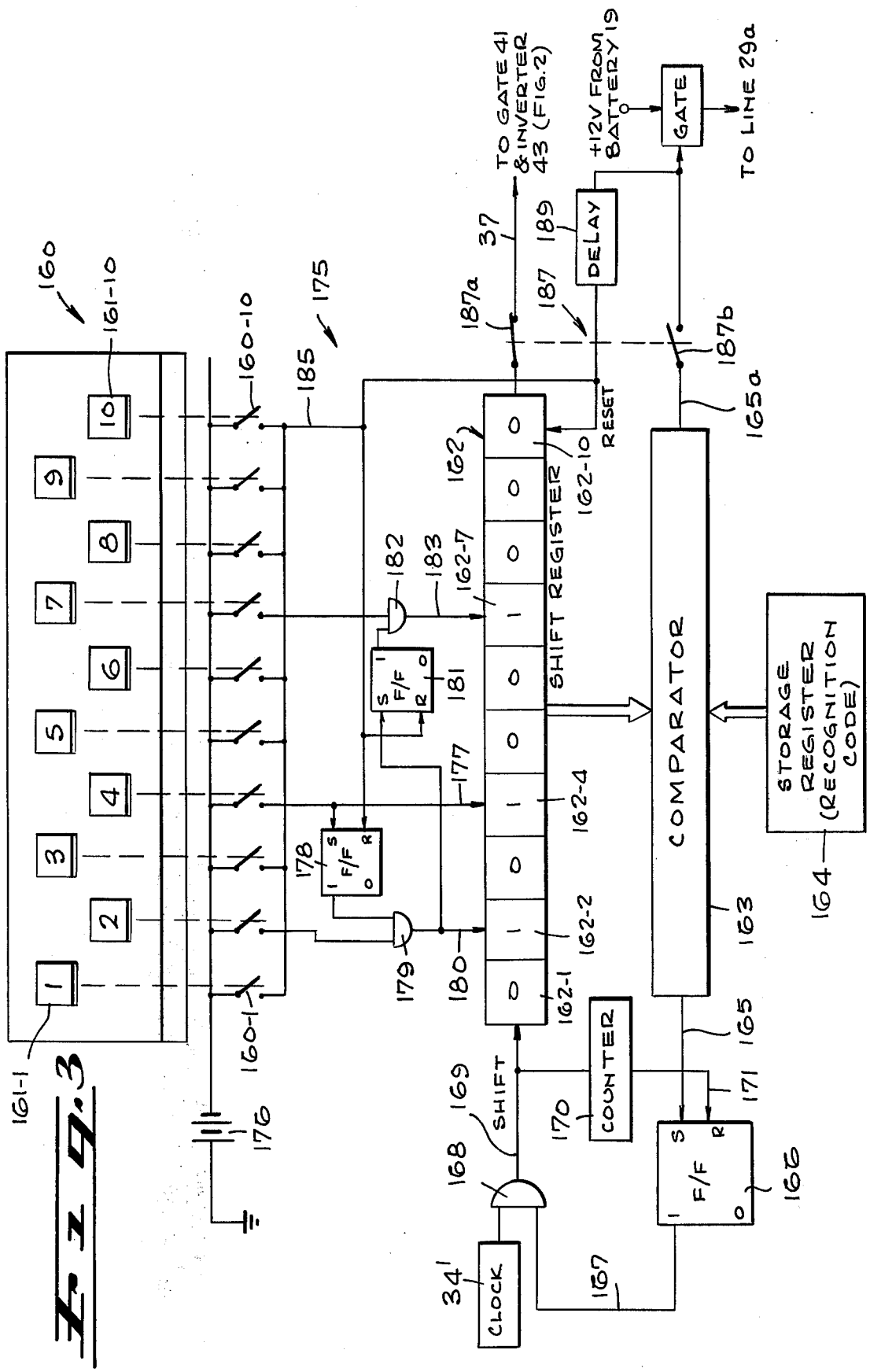

ENCODED ELECTRICAL CONTROL SYSTEMS FOR VEHICLES

BACKGROUND OF THE INVENTION

1. Field of the Invention

The present invention relates to encoded remote electrical control systems, and particularly to secure ignition systems for motor vehicles.

2. Description of the Prior Art

In a conventional motor vehicle ignition system, a key operated lock is used to actuate the ignition switch. Closure of the switch connects battery power to essential ignition system components such as the ignition coil and the distributor. In the "start" position, battery power also is supplied to the engine's starter. The security of such an ignition system depends on the integrity of the lock, and the degree to which the mechanical installation can prevent tampering or "hot-wiring".

A major weakness in conventional ignition systems is that the wire carrying power from the battery to the ignition coil goes by way of the ignition switch. Direct shorting of the switch contacts is all that is required to start and run the engine. Alternatively, the battery can be directly hot-wired to the ignition system components under the hood. Security is poor.

In the past, the usual approach to improving security has been to enclose the critical interconnections and components in rigid housings. At least one automobile manufacturer locates the ignition coil on the fire wall between the engine and the dashboard, and provides a unitary armored cable from the ignition coil housing to the key switch assembly. Since power must be supplied to the ignition coil to start the engine, "hot-wiring" can only be accomplished by physically destroying the armored cable assembly. While this can be done with the appropriate tools, it is sufficiently difficult so as to discourage a would-be thief who is anxious to accomplish the job quickly.

The difficulty with this prior art approach is that the cost of such armored assemblies is high, and their use complicates normal maintenance. For example, in the system just described if a wire within the ignition coil should break, the entire armored cable assembly must be taken out to permit removal and disassembly of the ignition coil. Replacement ignition coils are only sold as a unit with the armored cable attached.

An object of the present invention is to provide a secure ignition system for a motor vehicle which does not depend on extensive mechanical armoring to prevent theft or "hot-wiring". Another object is to provide a secure ignition system which utilizes an electrical code transmission device, preferably an integrated circuit chip contained in the ignition switch assembly, to transmit an encoded signal to a receiver/decoder associated with the essential ignition system components. Receipt of this signal causes the receiver/decoder to effectuate a necessary electrical connection to the ignition system component, thereby enabling engine operation.

"Hot-wiring" at the ignition switch is prevented since shorting of the leads to the switch and transmitter assembly will not cause transmission of the necessary code, and hence will not result in engine ignition. By enclosing the receiver/decoder and the circuitry used to effectuate the necessary ignition system connection in a small tamperproof housing, "hot-wiring" at the ignition coil or distributor likewise is prevented. The inventive system may be used in conjunction with a pushbutton type electronic combination lock in place of a key-operated lock.

SUMMARY OF THE INVENTION

These and other objectives are achieved by providing electrical control systems in which actuation of a switch or other control member causes an encoder/transmitter to generate a unique, encoded signal. At the controlled device, this signal is processed by a receiver/decoder that compares the signal code to a "recognition" code unique to the specific receiver. If the codes are identical, a power switch or other control circuit is enabled so as to effectuate the intended control function.

In motor vehicle applications, a secure ignition system is achieved by locating the encoder/transmitter in the key switch assembly housing, and by locating the receiver/decoder adjacent an essential ignition system component. When the ignition switch is closed, a unique code is transmitted which causes the receiver/decoder to effectuate a necessary electrical connection to that ignition system component. Security is achieved since (a) the shorting of the wires to the ignition switch and transmitter assembly will not cause transmission of the necessary code, (b) effectuating the necessary electrical connection cannot be accomplished without tampering with the receiver/decoder housing, and (c) insertion of a signal onto the line, as from a random signal generator, will not actuate the receiver/decoder without specific knowledge of the code that is unique to this particular motor vehicle.

BRIEF DESCRIPTION OF THE DRAWINGS

A detailed description of the invention will be made with reference to the accompanying drawings wherein like numerals designate corresponding parts in the several figures.

FIG. 2 is an electrical block diagram of the secure ignition system of FIG. 1, showing both the encoder/transmitter and receiver/decoder components.

FIG. 3 is an electrical block diagram of an alternative embodiment of the secure ignition system of FIG. 1, utilizing code selection switches for code entry or transmission actuation.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

Figure 1:
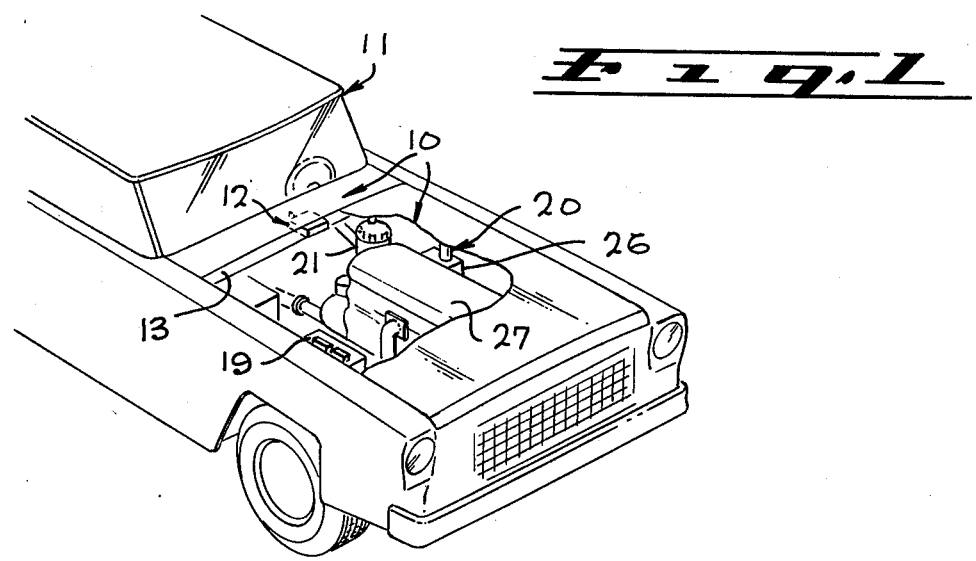
FIGS. 1 and 1A are pictorial views of the inventive secure ignition system for a motor vehicle.
Figure 1A:
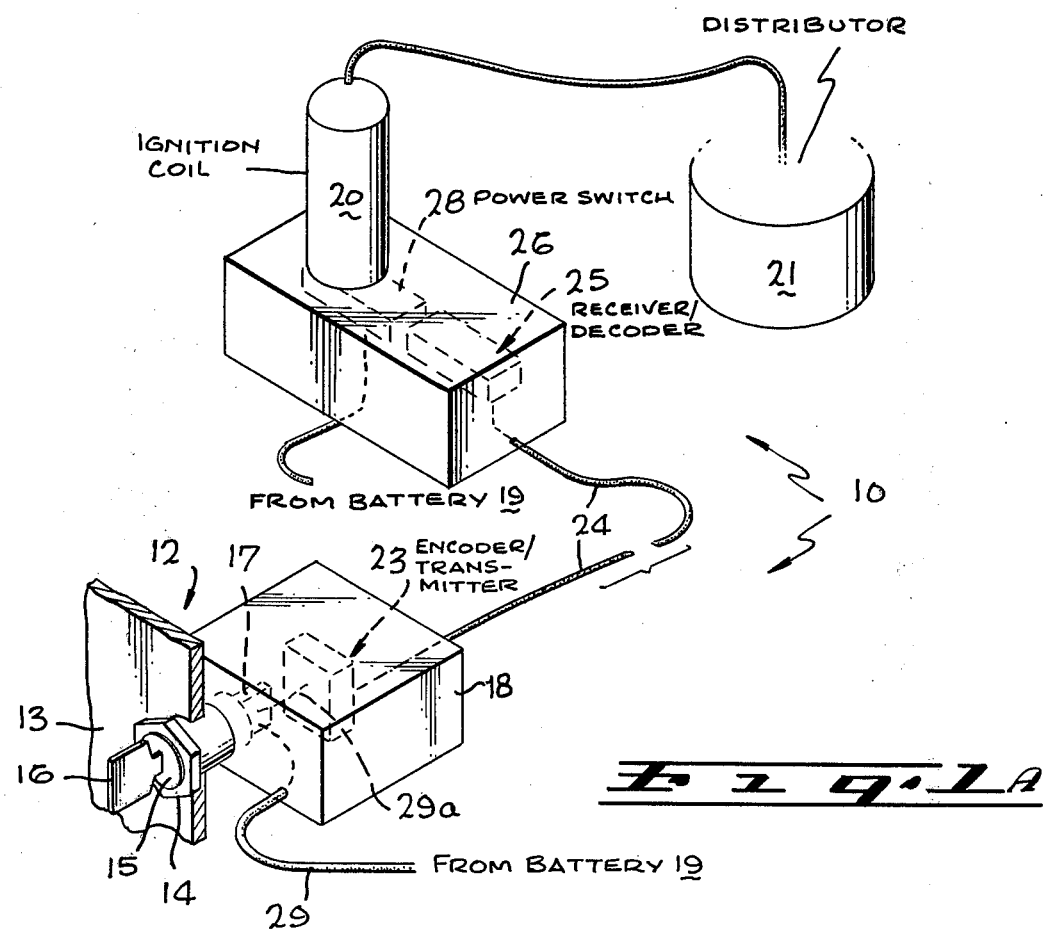

In FIG. 1, the inventive secure motor vehicle ignition system 10 is installed in an automobile 11. The key-operated ignition switch assembly 12 (FIG. 1A) is mounted on the dashboard 13 by means of a nut 14. The assembly 12 includes a conventional tumbler lock 15 which, when rotated by a key 16, closes a switch 17 contained within a tamperproof housing 18 that is an integral part of the assembly 12.

Unlike a conventional ignition system, the key-switch 17 does not directly connect power from the automobile battery 19 to the engine electrical components such as the ignition coil 20 and the distributor 21. Rather, in accordance with the present invention, the switch 17 actuates an encoder/transmitter 23 contained within the housing 18. This device 23 transmits a unique code via a line 24 to a receiver/decoder 25 contained in a rigid housing 26 that is mounted to the vehicle engine 27. Upon receipt of the correctly encoded signal from the transmitter 23, the receiver/decoder 25 actuates a power switch 28, also contained in the housing 26, to connect electrical power from the battery 19 to the ignition coil 20. The coil 20 itself is mounted on the tamperproof housing 26.

From the driver's point of view, operation of the inventive ignition system 10 is exactly as in a conventional automobile. That is, when the key 16 is turned, power is connected to the ignition coil 20 and the engine operates normally. From a security point of view, however, the operation is quite different. First, hot wiring of the ignition switch assembly is impossible. To short out the switch 17 would require physical entry into the housing 18, which preferably is sufficiently solid so as to prevent such tampering. If the wire 29 leading from the battery 19 to the housing 18 is shorted to the wire 24, electrical actuation will not result. This will merely apply a continuous dc voltage to the input of the receiver/decoder 25, and that device will not actuate the power switch 28 in the absence of the proper encoded signal. Preferably, the housing 26 itself is sufficiently rigid so as to prevent tampering or "hot-wiring" of the power switch 28. In other words, there is no way of connecting the battery 19 to the primary of the ignition coil 20 except by forcibly breaking into the housing 26 and shorting out the power switch 28.

A would-be thief of some technical bent may try to actuate the receiver/decoder 25 by connecting a signal generator to the line 24 so as to simulate the encoder/transmitter 23. However, even if the data format on the line 24 were known, the thief would not know the specific code that is produced by the encoder/transmitter 23, since advantageously that code is unique to each vehicle 11. If the wrong code is received by the decoder 25, the power switch 28 will not be actuated. Furthermore, if the code is of sufficient length (i.e., number of binary bits), then even if a random binary number generator were connected to the line 24, the probability of generating the specific code for this vehicle 11 is extremely low. In this manner, high security is achieved.

Typical circuitry for the encoder/transmitter 23 and for the receiver/decoder 25 is shown in FIG. 2. However, the invention is by no means limited to this particular circuitry embodiment, and any alternative means for producing an encoded signal may be used as the transmitter 23 in conjunction with any corresponding decoder circuitry in the receiver 25. Advantageously, but not necessarily, the encoder/transmitter 23 may be implemented using an integrated circuit chip of small size, so that the housing 18 need be no larger than the switch housings currently in use. Similarly, the receiver/decoder 25 may be implemented using integrated circuit technology.

In the embodiment of FIG. 2, the code is stored in a read only memory 31, and preferably consists of N binary bits. For example, this code may be "1 0 0 1 1 0". Advantageously, each bit of the code is stored in a single storage location of the memory 31 and is accessed therefrom as the address of the corresponding location is provided to the memory 31 on a line 32 from a counter 33.

When the key switch 17 is closed, battery power is supplied to the memory 31, to the counter 33 and to a clock 34 via a line 29a. Clock pulses are supplied via a line 35 to increment the counter 33. In turn, the counter output on the line 32 sequentially accesses the stored code from the memory 31 and provides this code 36' on a line 36.

The code is converted to a bi-level format for transmission on the line 24 by circuitry including a voltage divider consisting of the resisters 37, 38 and a pair of gates 39, 40. When a binary "1" is present on the line 36 concurrently with a clock pulse 35', an AND-gate 41 enables the gate 39 to supply a +12 volt signal from the line 29a via a diode 42 to the line 24. When a binary "0" is present on the line 36, a lower level signal of say +4 volts is provided to the line 24. The voltage divider 37, 38 supplies a constant +4 volt signal to the gate 40. The low or binary "0" signal on the line 36 provides a high output from an inverter 43 that provides one input to an AND-gate 44 which is enabled by the clock pulses 35'. The resultant output from the AND-gate 44 enables the gate 40 to supply the +4 level via a diode 45 to the line 24 each time a binary "0" is read from the memory 31. The resultant bi-level encoded signal present on the line 24 is illustrated by the wave shape 24' in FIG. 2. This signal format has the advantage of permitting easy recovery of the clock pulses at the receiver 25, and thus simplifies synchronization in the system.

In the receiver 25, a level detector 47 provides a high output on a line 48 whenever a +12 volt signal is detected on the line 24 indicating the presence of a binary "1". Similarly, the detector 47 provides a high signal on a line 49 whenever a +4 volt signal is detected indicating a binary "0". By combining these signals on the lines 48 and 49 in an OR-gate 50, a clock pulse train 35a is recovered on a line 51 that is exactly synchronous with the clock pulses 35' from the clock 34. These pulses 35a are used to shift a shift register 52 that receives the incoming data stream from the line 48. As indicated by the wave shape 36a, this data stream corresponds to the code 36' read out of the memory 31.

A code identical to that contained in the read only memory 31 is stored in a register 53. This recognition is compared with the contents of the shift register 52 by a comparator 54. If the correct code is received from the line 24, the comparator 54 will provide a high signal on a line 55 that sets a flip flop 56 to the "1" state. As a result, an enable signal will be provided from the flip flop "1" output via a line 57 to turn on the power switch 28. This will connect power from the battery 19 to the ignition coil 20 and to the distributor 21. Of course, if an incorrect code is received, no output will be provided from the comparator 54, the flip flop will remain in the "0" state, and the power switch 28 will remain off.

Note that in the embodiment of FIG. 2, power is supplied to the memory 31, the counter 33 and the clock 34 for as long as the key switch 17 remains closed. Therefore, since the counter 33 if of module N and hence recycles repetitively, the code signal 24' will be transmitted down the line 24 for as long as the switch 17 remains closed. As a result, in the receiver 25, the comparator 54 will produce a sequential set of pulses on the line 55. These pulses will occur once for each complete transmission of the code for as long as the key switch 17 is actuated. A timing circuit 59 is used to reset the flip flop 56, and thereby turn off the power switch 28, after the last transmission of the code from the transmitter 23.

To this end, the circuit 59 includes a clock 60 and a counter 61 that cooperate to produce a reset pulse on a line 62 after a time duration slightly greater than that required to transmit the entire stored code. The counter 61 is reset by occurence of the pulse on the line 55. Therefore, if the code 24' were transmitted only once, the single resultant pulse on the line 55 would set the flip flop 56 to the "1" state and also reset the counter 61 to zero. A short time later, the output from the counter 61 will reset the flip flop 56 to the "0" state thereby terminating the signal on the line 57 and turning off the power switch 28. However, if the code 24a is transmitted once again before the counter 61 provides the output pulse on the line 62, the resultant signal on the line 55 will reset the counter 61 and start a new time period. As a result, the flip flop 56 will remain set to "1" and the power switch 28 will remain on. With this arrangement, the switch 28 in fact will remain on as long as the key switch 17 is held closed. Shortly after the switch 17 is opened, the power switch 28 will turn off.

The ignition switch assembly 12 also can be used to control the engine starter. In one implementation (not shown), the switch 17 may have a second set of contacts that enable another encoder/transmitter (not shown) identical to the device 23 and also contained in the housing 18. The output from that transmitter then may be supplied via another line like the line 24 to another receiver/decoder identical to the receiver 25. That receiver may be used to control another power switch, analogous to the switch 28, that connects battery power to the engine starter.

An alternative implementation is shown in FIG. 2. Therein, the encoder/transmitter 23 stores a second code in the memory 31 which is selectively accessed when the starter switch contacts 63 of the switch assembly 12 are closed. This provides power to the clock 34, counter 33 and memory 31 via a line 29b, a diode 64 and the line 29a. The signal on the line 29b also conditions the memory 31 for readout of the starter-indicating code.

The receiver/decoder 25 has a second storage register 65 containing the corresponding starter recognition code, together with a second comparator 66 for comparing that code with the contents of the shift register 52. When the second "starter" code is present, the resultant high output signal from the comparator 66 present on a line 67, actuates a starter switch 68 which then connects power from the battery 19 to the starter 69.

Although not illustrated, time-based codes could be employed in connection with the present invention. For example, the encoder/transmitter 23 could generate a unique code consisting of a sequence of pulses of different, controlled time duration. A quartz crystal-controlled oscillator, not unlike that employed in a digital electronic watch, could be used as the time standard, together with appropriate circuitry for generating the time-based code. A similar time standard and comparison circuitry could be used in the receiver/decoder 25 to recognize the specific time-encoded signal and provide the control signal to the power switch 28.

FIG. 3 shows an alternative embodiment of the secure ignition system for a motor vehicle, wherein an electronic combination lock is used in place of the keylock ignition switch, or in which the correct code first must be entered by the driver using a set of code selection switches 160.

In one mode of operation, the proper subset of pushbuttons 161-1 through 161-10 must be depressed in the correct order so as to enter the correct code into a shift register 162. This correct code then is transmitted to the receiver/decoder 25 (FIG. 2) to actuate the engine as described above.

The presence of the correct code in the register 162 is ascertained by a comparator 163 which compares these contents with a recognition code contained in a storage register 164. In embodiments wherein the contents of the shift register 162 is transmitted to the receiver/decoder 25, the recognition code stored in the register 164 will be the same as that stored in the register 53 of the receiver/decoder 25.

Upon determination that the correct code has been entered via the selection switches 160, the comparator 163 will provide a high output on a line 165 to set a flip flop 166 to the "1" state. The resultant high signal on a line 167 will enable an AND-gate 168 to transmit clock pulses from a clock 34' to the shift input 169 of the register 162. This will cause the code stored therein to be read out serially onto the line 36. From there the code is converted to bi-level format by the circuitry shown in FIG. 2 for transmission to the receiver/decoder 25.

Code transmission is terminated by resetting the flip flop 166, and thereby disabling the AND-gate 168, after the code has been read out of the shift register 162. To this end, the clock pulses fed to the shift input 169 also are supplied to a counter 170. When the counter 170 reaches a count equal to the number of bits in the code stored in the shift register 162, an output is provided on a line 171 to reset the flip flop 166 and thereby terminate code transmission.

Illustrative circuitry 175 indicates the manner in which the switches 160-1 through 160-10 may be connected for code selection and entry into the shift register 162. In the typical embodiment shown, the pushbuttons 161-4, 161-2 and 161-7 must be depressed in that order to enter the correct code. In this embodiment, the correct code then has a binary "1" in each of shift register positions 162-2, 162-4 and 162-7, and has a binary "0" in each of the other shift register 162 positions.

If the correct pushbutton 161-4 first is depressed, the switch 160-4 is closed so as to connect a voltage from a battery 176 via a line 177 to the register storage position 162-4, thereby causing a binary "1" to be entered into this location. The signal on the line 177 also sets a flip flop 178 to the "1" state so as to enable an AND-gate 179. If the correct pushbutton 162-2 next is depressed, the AND-gate 179 receives a second input and thus provides a high output on a line 180 that causes a "1" to be entered into the shift register position 162-2. The high signal on the line 180 also sets a flip flop 181 to the "1" state so as to enable an AND-gate 182. If the correct pushbutton 161-7 next is depressed, a second input is provided to the AND-gate 182 which in turn provides a high output on a line 183 that enters a binary "1" into the register position 162-7. The correct code now is contained in the shift register 162.

The cooperation of the flip flops 178, 181 and the AND-gates 179, 182 insure that the pushbuttons 161-4, 161-2 and 161-7 must be depressed in that order to accomplish correct code entry. An appropriate mechanical or electrical interlock (known per se and not shown) may be used to prevent code entry by simultaneous depression of these three pushbuttons. The switches associated with the remaining pushbuttons (e.g., the switches 160-1, 160-3, 160-5, etc.) all are connected via a common line 185 to the reset input of the shift register 162 and to the reset inputs of the flip flops 178 and 181. Thus if any of these incorrect pushbuttons are depressed, the shift register 162 contents will be set to zero, and the flip flops 178 and 181 will be reset so that correct code entry is not accomplished. Of course, this pushbutton code selection circuitry is illustrative only, and the invention is by no means limited to the particular embodiment shown.

The pushbutton assembly 160 may be used solely to replace the key-lock operated ignition switch 17 (FIG. 2), and not for entry of the code transmitted to the receiver/decoder 25. To this end, a ganged switch 187 is actuated so as to open the normally closed contacts 187a and to close the normally open contacts 187b. As a result, when the correct code has been entered into the shift register 162, the high output of the comparator 163 on a line 165a will be supplied via the closed switch 187b to a gate 188. This gate 188 replaces the switch 17 (FIG. 2) and connects the voltage from the battery 19 to the line 29a. The encoder/transmitter 23 then operates as described above to transmit the code stored in the memory 31. This in turn is recognized by the receiver/decoder 25 and actuates the power switch 28. Of course, in this embodiment the recognition code stored in the register 164 (FIG. 8) need not be the same as that contained in the memory 31 and the storage register 53, and preferably is different. To actuate the engine, the user must select via the switches 160 that code which is stored in the register 164. The signal on the line 165a from the comparator 163 also is supplied via a delay circuit 169 to the reset terminal of the shift register 162 so as to reset the contents thereof to zero after correct code recognition has been completed.

Intending to claim all novel, useful and unobvious features shown or described, the applicant claims:

1. A secure ignition system for a motor vehicle having an ignition switch and having an ignition system electrical component essential for engine operation, said system comprising:
   an encoder/transmitter for transmitting a unique, digitally encoded signal in response to actuation of said ignition switch,
   a first tamperproof housing enclosing at least part of said ignition switch, said encoder/transmitter and the interconnections therebetween, to prevent tampered actuation of said encoder/transmitter,
   receiver/decoder means, receiving the digitally encoded signal from said encoder/transmitter, for effectuating a necessary electrical connection to said essential electrical component in response to receipt only of said unique, encoded signal,
   another tamperproof housing enclosing at least part of said essential electrical component, said receiver/decoder means and the interconnections therebetween, to prevent tampered effectuation of said necessary electrical connection, together with
   another like encoder/transmitter and receiver/decoder means, said other encoder/transmitter transmitting a different unique, encoded signal in response to actuation of said ignition switch to the "engine start" position, and wherein said other receiver/decoder actuates the starter of said motor vehicle in response to reception only of said different encoded signal.

2. A secure ignition system according to claim 1 wherein said ignition switch is operated by a key lock.

3. A secure ignition system for a motor vehicle having an ignition switch and having an ignition system electrical component essential for engine operation, said system comprising:
   an encoder/transmitter for transmitting a unique, digitally encoded signal in response to actuation of said ignition switch,
   a first tamperproof housing enclosing at least part of said ignition switch, said encoder/transmitter and the interconnections therebetween, to prevent tampered actuation of said encoder/transmitter,
   receiver/decoder means, receiving the digitally encoded signal from said encoder/transmitter, for effectuating a necessary electrical connection to said essential electrical component in response to receipt only of said unique, encoded signal, and
   another tamperproof housing enclosing at least part of said essential electrical component, said receiver/decoder means and the interconnections therebetween, to prevent tampered effectuation of said necessary electrical connection, and wherein:
   said encoder/transmitter contains code storage means providing a digital code unique to that specific encoder/transmitter, and means for automatically transmitting this provided code as said unique, encoded signal when said ignition switch is actuated, and wherein:
   said receiver/decoder means includes means for storing a digital recognition code, comparator means for comparing the code of the signal received from said encoder/transmitter with said recognition code supplied from said means for storing, and switch means, connected to said comparator means, for effectuating said necessary electrical connection in response to an output from said comparator means indicating that the code of said received signal is identical to said stored recognition code.

4. A secure ignition system according to claim 3 further comprising a line connecting said encoder/transmitter and said receiver/decoder, said digitally encoded signal being transmitted from said encoder/transmitter to said receiver/decoder via said line.

5. A secure ignition system for a motor vehicle having an ignition switch and having an ignition system electrical component essential for engine operation, said system comprising:
   an encoder/transmitter for transmitting a unique, digitally encoded signal in response to actuation of said ignition switch,
   a first tamperproof housing enclosing at least part of said ignition switch, said encoder/transmitter and the interconnection therebetween, to prevent tampered actuation of said encoder/transmitter,
   receiver/decoder means, receiving the digitally encoded signal from said encoder/transmitter, for effectuating a necessary electrical connection to said essential electrical component in response to receipt only of said unique, encoded signal,
   another tamperproof housing enclosing at least part of said essential electrical component, said receiver/decoder means and the interconnections therebetween, to prevent tampered effectuation of said necessary electrical connection,
   said encoder/transmitter containing code storage means providing a digital code unique to that specific encoder/transmitter, and means for automatically transmitting this provided code as said unique, encoded signal when said ignition switch is actuated, said receiver/decoder means including means for storing a digital recognition code, comparator means for comparing the code of the signal received from said encoder/transmitter with said recognition code supplied from said means for storing, and switch means, connection to said comparator means, for effectuating said necessary electrical connection in response to an output from said comparator means indicating that the code of said received signal is identical to said stored recognition code, and wherein:

said code storage means contains two different codes, and wherein the first of said different codes is provided when the ignition switch is actuated in the "start" position and wherein the second of said different codes is provided when said ignition switch is actuated in the "ignition" position, and wherein:

said receiver/decoder means includes means for storing a second "starter" recognition code, and second comparator means for comparing the code of the signal received from said encoder/transmitter with said stored second recognition code and for energizing the starter of said motor vehicle when said received signal code and said second recognition code are identical.

6. A secure ignition system for a motor vehicle, comprising:

first means for effectuating a necessary electrical connection to an ignition system component essential for operation of the motor of said vehicle in response only to receipt of a signal containing a certain code recognized only by said first means, said first means including circuitry for storing a recognition code unique to that motor vehicle, a comparator for comparing the code of the received signal with the stored recognition code, and a circuit for effectuating said necessary connection only upon detection by said comparator that the received and stored codes are identical, second means, actuated by a switch assembly in said motor vehicle, for transmitting to said first means a signal containing said certain code, and wherein said signal contains a digital code, wherein said first and second means are connected by a line, and wherein said second means comprises a register for storing a code identical to said recognition code, and transmission circuitry for sending said identical code from said register via said line in response to actuation of said switch assembly.

7. A secure ignition system according to claim 6 wherein said second means further comprises a set of code selection switches, and means for entering into said register the code selected by said selection switches so that said first means will effectuate said necessary electrical connection only if the correct identical code is entered via said selection switches.

8. A secure ignition system according to claim 7 wherein said switch assembly comprises an ignition switch which itself is actuated by correct code selection via said selection switches.

9. A secure ignition system according to claim 6 wherein:

said first means is situated in a first tamperproof housing, the leads for effectuating said necessary electrical connection being entirely within said first tamperproof housing so that a parallel connection to said essential component cannot be effectuated externally to said first tamperproof housing, and wherein said second means is situated in a second tamperproof housing, the external leads to said second means being a voltage source line and said line connecting said second means to said first means, so that shorting of said external leads will connect said voltage source to said line but will not cause effectuation of said necessary electrical connection since no code will be sent to said first means.

10. A secure ignition system according to claim 6 wherein said transmission circuitry provides a code signal consisting of a sequence of pulses of different time duration.

* * * * *